United States Patent [19]

Kurita et al.

[11] 4,129,137

[45] Dec. 12, 1978

[54] WASHING APPARATUS FOR FILTER PRESS

[75] Inventors: Tetsuya Kurita, Takarazuka; Toshifumi Hara, Nishinomiya, both of Japan

[73] Assignee: Kurita Machinery Manufacturing Company Limited, Osaka, Japan

[21] Appl. No.: 848,728

[22] Filed: Nov. 4, 1977

[51] Int. Cl.[2] .............................................. B08B 3/02
[52] U.S. Cl. .................................. 134/144; 134/172; 134/181; 134/198
[58] Field of Search ............... 134/144, 148, 151, 165, 134/172, 180–181, 198

[56] References Cited

U.S. PATENT DOCUMENTS

| 3,620,233 | 11/1971 | Busse et al. | 134/172 X |
| 3,633,651 | 1/1972 | Ruhlandt | 134/172 X |
| 3,780,747 | 12/1973 | Stadie et al. | 134/172 X |
| 4,076,033 | 2/1978 | Busse et al. | 134/172 |

Primary Examiner—Robert L. Bleutge
Attorney, Agent, or Firm—Holman & Stern

[57] ABSTRACT

A washing apparatus for a filter press comprises a spray pipe having a number of nozzles and disposed outside of the filter plates so as to extend parallel to one side of such filter plate, a movable unit in which one end of the spray pipe opposed to a lower corner of such filter plate is pivotally mounted and which is movable in a region outside of the filter plates parallelly to the latter, a carriage supporting the movable unit and movable in a region outside of the filter plates in the direction of movement of the latter, which carriage, each time a filter plate is transferred toward a movable end plate, serves to carry the movable unit in a direction opposite to the direction of such transfer so as to position the spray pipe between separated filter plates, a mechanism for moving the movable unit to and fro when the spray pipe is positioned between separated filter plates, and a second mechanism for raising and lowering the spray pipe synchronously with the to-and-fro movement of the movable unit, these mechanisms being disposed below the filter plates.

8 Claims, 19 Drawing Figures

WASHING APPARATUS FOR FILTER PRESS

BACKGROUND OF THE INVENTION

The present invention relates to a washing apparatus for a filter press designed so that when filter plates are moved one by one toward a movable end plate upon completion of each filtration cycle to successively separate each filter plate from an adjacent one for removal of a cake held therebetween, it sprays a washing liquid against a filter sheet spread over filter plates or against a filter surface with such filter sheet removed therefrom, thereby effecting automatic washing of the filter sheet or filter surface.

There have been two types of such apparatuses, a first type exemplified by British Pat. No. 1,271,192 wherein movement of a spray pipe toward and away from between separated filter plates and washing operation are effected by the linear to-and-from movement of the spray pipe, and a second type exemplified by German Pat. No. 1,611,097 wherein washing is effected by turning a spray pipe toward and away from between separated filter plates and linearly reciprocating the advanced spray pipe. In the first type, the movement of the spray pipe is simple but there is required a cylinder having a length corresponding to the stroke thereof and projecting a substantial distance outwardly of the filter press, thus increasing the size of the whole equipment and complicating the mechanism. Further, a device required for moving the spray pipe from one end to the other of the machine in the direction of movement of the filter plates occupies a very large space in the building in which the filter press is installed. Therefore, the installation of a filter press having a washing apparatus or the attachment of a washing apparatus to an existing filter press is difficult.

In the second type, a spray pipe disposed above the filter plates is rotated around an axis separate therefrom to and fro between a waiting position outside of the filter plates and a washing position, requiring so large a swing diameter that it projects a substantial distance beyond the filter plates even when it is in the waiting position. Further, the reciprocating movement in the washing position is effected by a cylinder, which upwardly projects a substantial distance. Therefore, the washing apparatus has the disadvantage of making too large the size of the upper portion of the space occupied by the filter press.

In either type, the necessary movement of the spray pipe is effected by a cylinder, a complicated control mechanism having a number of fluid handling elements incorporated therein is required and yet a secure and stable action can hardly be expected. Further, not only in the first type but also in the second type, during the rotation of the spray pipe, washing is impossible since no spray is given to the filter press. Therefore, washing is only effected during a simple to-and-fro movement of the spray pipe and hence the washing effect is low.

SUMMARY OF THE INVENTION

An object of the present invention is to provide a washing apparatus which can be installed and operated in a small space, e.g., a space available under the filter plates of a filter press installed in the usual manner and which provides a superior washing effect.

Another object of the invention is to simplify the construction and securely transmit a motion to a shower pipe with a more efficient timing.

A feature of the invention is that a shower pipe having a number of nozzles is disposed adjacent the filter plates so as to be parallel to one side of such filter plate and one end of said pipe is pivotally mounted in a movable unit at a position opposed to a lower corner of such filter plate, said unit being adapted to be moved in a region outside of the filter plates parallelly to the latter. Further, the movable unit is supported by a carriage adapted to be moved in a region outside the filter plates in the direction of movement of the latter. As a result, each time a filter plate is transferred toward a movable end plate, the carriage is moved so that the shower pipe is correctly positioned between and opposed to separated adjacent filter plates. When the shower pipe reaches this opposed position, it is then moved to and fro parallelly to the filter plates by the movement of the movable unit. At the start of this to-and-fro movement, the shower pipe is turned through and arc of 90° around a pivot point opposed to a lower corner of the filter plate to be brought into a position where it is at right angles with the direction of the to-and-fro movement and parallel to another side of the filter plate. Upon completion of the to-and-fro movement, the shower pipe, at the to-and-fro movement starting position, is turned in the opposite direction through an arc of 90° to the original waiting position.

Therefore, the shower pipe is positioned between adjacent filter plates during its arcuate and linear to-and-fro movements for washing the filter sheet or filter surface, the two to-and-fro movements in different directions improving the washing effect. Further, since the shower pipe is turned around its one end opposed to a lower corner of the filter plate between a first position where it is parallel to an adjacent side of the filter plate and a second position where it is parallel to another side of the filter plate and it is then advanced into between separated adjacent filter plates and retracted therefrom, the required range of swing is very small, being within the space occupied by the filter plates. Moreover, the spray pipe waiting position and the movement of the carriage require only a very small space along the filter plates. As a result, the entire arrangement becomes compact, thus facilitating the installation of a filter press equipped with a washing apparatus or the attachment of a washing apparatus to an existing filter press.

The washing apparatus according to the present invention is installed by utilizing the space usually defined below the filter plates. This eliminates the need for adjusting the installation height of the filter press, with no part projecting into a cake storage section. With no part projecting laterally and upwardly of the filter press, the space for installation and operation of the filter press is the same as that for a filter press having no washing apparatus.

Another feature of the present invention is that the movement of the movable unit, the movement of the carriage and the arcuate movement of the spray pipe are effected by separate drive sources.

A further feature of the invention is that the movement of the movable unit and the movement of the carriage are effected by separate drive sources while the arcuate movement of the spray pipe is effected by a mechanism operatively associated with the movement of the movable unit. In this case, one drive source is saved, making accurate the timing relation between the movement of the movable unit and the arcuate movement of the spray pipe.

Another feature of the invention is that the movement of the carriage is effected in operative association with the forward and backward drive of a filter plate transfer device for transferring the filter plates one by one toward the movable end plate and particularly the forward movement of the transfer unit to approach a filter plate for transferring the same. As a result, one more drive source is saved and the spray pipe can be correctly and accurately moved to a predetermined position between separated adjacent filter plates each time a filter plate is transferred.

These and other features of the invention will become more apparent in the following detailed description when considered in connection with the accompanying drawings.

BRIEF DESCRIPTION OF THE DRAWINGS

FIGS. 5 through 10 are schematic sectional views showing the operation of a spray pipe turning mechanism included in the embodiment shown in FIG. 4, in which FIGS. 5, 7 and 9 show a driven member adapted to be actuated by the movement of the movable unit while FIGS. 6, 8 and 10 show a spring mechanism for holding the driven member in two different positions according to the operation thereof;

DESCRIPTION OF THE PREFERRED EMBODIMENTS

Figure 1:
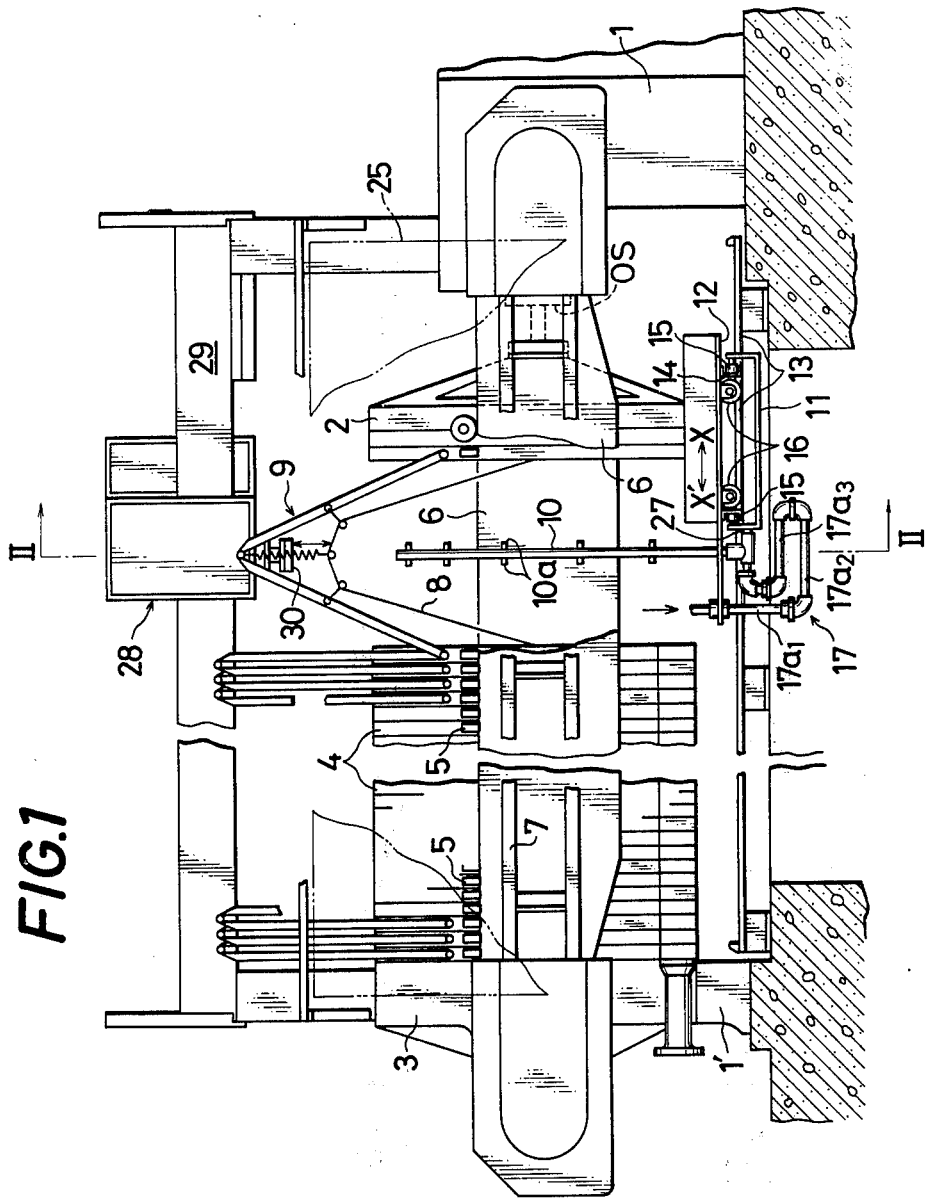
FIG. 1 is a side view of a filter press equipped with a washing apparatus according to an embodiment of the present invention.
Figure 2:
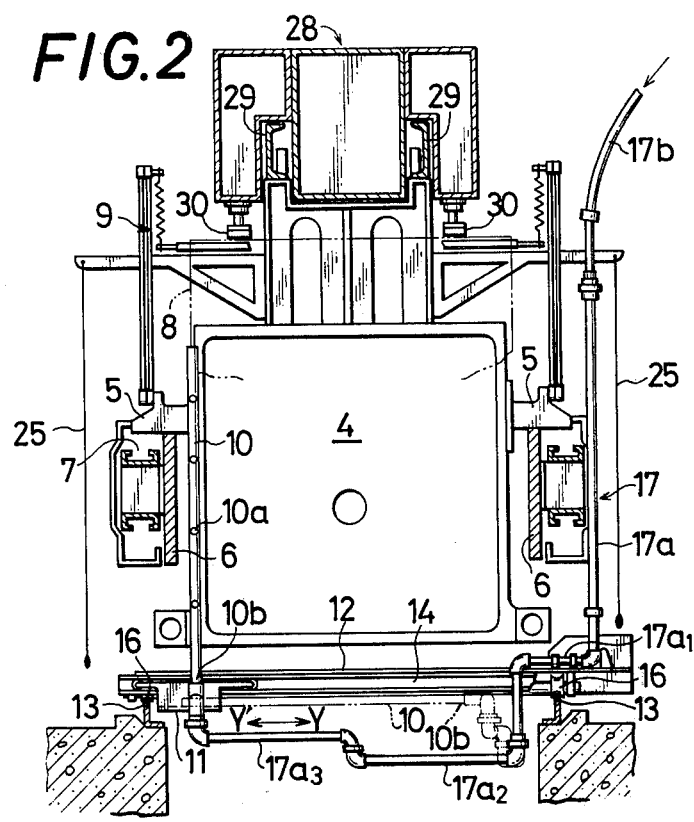
FIG. 2 is a sectional view taken along the line II—II of FIG. 1, showing a front view of the washing apparatus.
Figure 3:
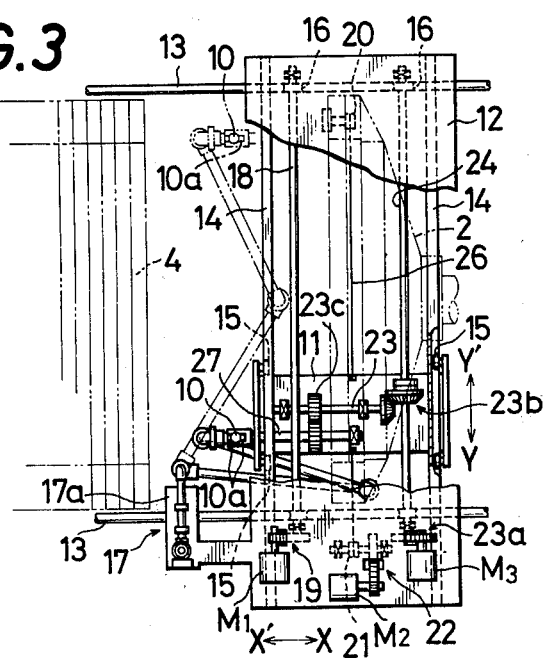
FIG. 3 is a plan view, partly broken away, showing the washing apparatus alone, with a portion of the filter press shown in phantom lines.
Figure 4:
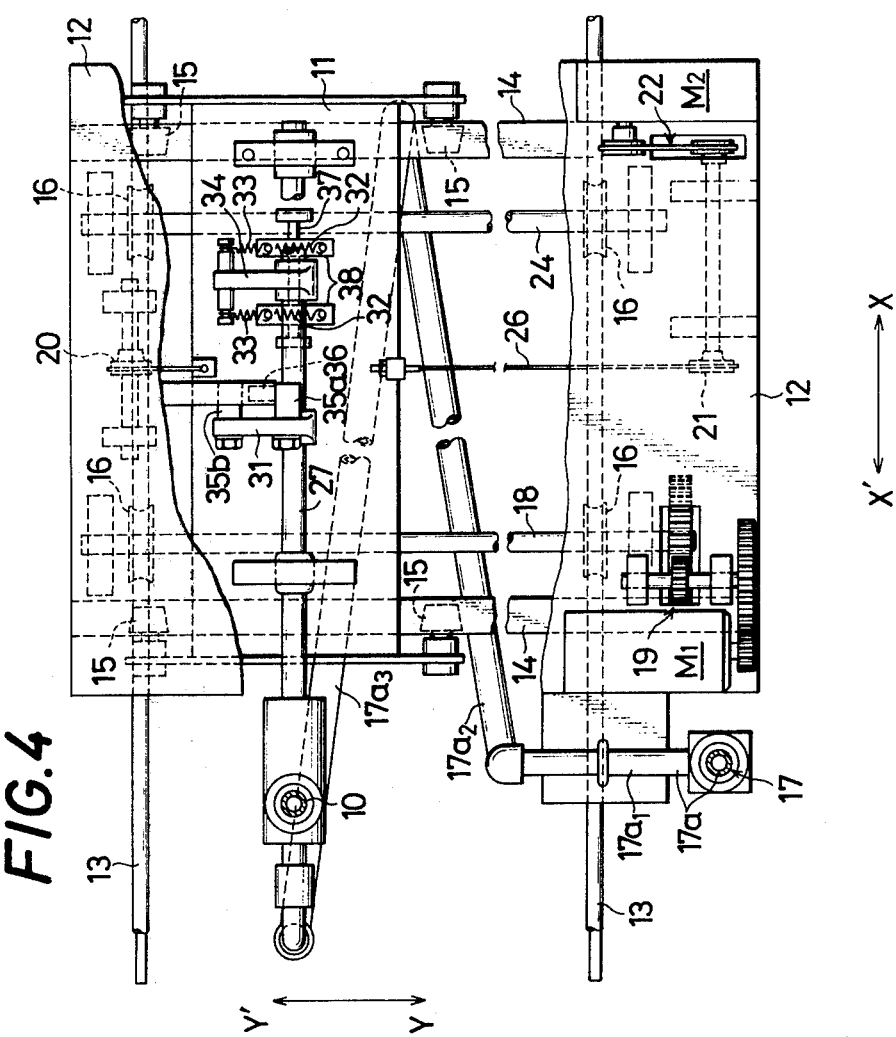
FIG. 4 is a plan view, partly broken away, showing another embodiment of the invention, illustrating a washing apparatus wherein a spray pipe executes arcuate movement in operative association with the forward and backward movement of a movable unit, on which it is carried, parallelly to the filter plates.

Referring to an embodiment of the invention shown in FIGS. 1 through 3, a machine frame 1 is provided with a hydraulic cylinder OS for advancing and retracting a movable end plate 2 and another machine frame 1' is provided with a fixed end plate 3 integral therewith. The movable end plate 2 connected to the cylinder OS and a number of filter plates 4 disposed between the movable end plate 2 and the fixed end plate 3 have handles 5 projecting from their opposite sides by which they are slidably suspended on suspension side bars 6 extending between the machine frames 1 and 1'. The handles of the movable end plate 2 alone have rollers mounted thereon. The end plates 2, 3 and filter plates 4 have filter sheets 8 spread over their filter surfaces, each filter sheet being associated with adjacent plates and suspended by a link pair 9 installed between adjacent filter plates 4 so as to be opened and closed by the separation and contact of adjacent filter plates associated therewith. Designated at 7 are rails for a known transfer unit (not shown) for transferring the filter plates one by one toward the movable end plate 2.

When filtration is to be effected, the filter plates 4 are clamped between the end plates 2 and 3 by the forward movement of the movable end plate 2 toward the fixed end plate 3 while a solution is fed into filter chambers defined between adjacent plates 4 and between either end plate 2 or 3 and an adjacent plate 4. This solution is filtered by the filter sheets 8 attached to the end plates 2, 3 and filter plates 4, and the filtrate which has passed through the filter sheets 8 is introduced into the outside of the filter press while the cakes remain in the respective filter chambers. The cakes fall downwardly in that when, upon completion of a filtration cycle, the movable end plate 2 is retracted and the filter plates 4 are transferred one by one toward the retracted movable end plate 2, the filter plates 4 and end plates 2, 3 are successively separated from each other to open the filter chambers. A filter sheet vibrating mechanism 28 is disposed above the filter plates 4 and supported for movement toward the filter plates on guide rails 29 laid on the upper ends of the machine frames 1, 1'. In synchronism with the movement of the filter plates 4 one by one toward the movable end plate 2, the filter vibrating mechanism is moved by an unillustrated drive mechanism in the direction opposite to the direction of movement of the filter plates, and when it is positioned above a filter sheet 8 between separated filter plates 4, a vibrator 30 is actuated to impart vibrations to said filter sheet 8, thereby assisting the cake in separating from the filter sheet 8 when it falls downwardly.

A spray pipe 10 for washing the filter sheets 8 or filter surfaces has a number of nozzles 10a and is normally disposed parallel to the lower sides of the filter plates 4, as shown in phantom lines in FIG. 2, and pivotally mounted at one end 10b thereof corresponding to a corner of the filter plate 4 in a movable unit 11 movable in the direction Y-Y', so that the spray pipe can be raised to a vertical position shown in solid lines in FIG. 2. The movable unit 11 is supported by a carriage 12 movable in the direction X-X' which is parallel to the direction of movement of the filter plates 4. The carriage 12 has wheels 16 by which it is moved in the direction X-X' on a pair of rails 13 laid on the floor. It also has another pair of rails 14 extending at right angles with the direction of movement thereof, on which rails said movable unit 11 is moved in the direction Y-Y' by wheels 15.

A supply pipe 17 for supplying washing water to the spray pipe 10 is constituted by a non-flexible pipe 17a adjacent the spray pipe 10 and a flexible pipe 17b adjacent an unillustrated washing water supply source, but it may be constituted entirely by such flexible pipe 17b. The non-flexible pipe 17a comprises a fixed pipe portion 17a1 attached to the carriage 12, and bendable pipe portions 17a2 and 17a3 connected to said fixed pipe portion 17a1 and to one end 10b of the spray pipe 10 supported by said movable unit 11. The flexible pipe 17b may be in the form of a coil which expansibly extends to the ceiling of the filter press so as to allow the movement of the fixed pipe portion 17a1 concomitant to the movement of the carriage 12.

A motor M1 on the carriage 12 shown in FIG. 3 is connected through a transmission mechanism 19 to the rotatable shaft 18 of the wheels 16 disposed on the X'-direction side so as to rotate the wheels 16 forwardly and backwardly to move the carriage 12 in the direction X–X'. As for the movement of the carriage 12, each time a filter plate 4 is transferred toward the movable end plate 2, the motor M1 is energized to move the carriage 12 a fixed distance in the direction X' so as to move the spray pipe 10 to a fixed position beteen separated adjacent filter plates 4. In the final step, the motor M1 is reversely rotated to return the carriage 12 to its original position. A second motor M2 on the carriage 12 is connected through a transmission mechanism 22 to a sprocket 21 which is one of a pair of sprockets 20, 21 on the carriage 12 for entraining a chain 26 fixed in part to the movable unit 11, so that the forward and backward rotation of the motor M2 moves the movable unit 11 in the direction Y–Y'. This movement of the unit 11 is such that when the carriage 12 carries the spray pipe 10 to a position between separated adjacent filter plates 4 and stops there, the motor M2 is forwardly rotated to move the movable unit 11 in the direction Y' until the unit reaches the terminal end, whereupon the motor M2 is backwardly rotated to move the movable unit 11 in the direction Y to its original position. A third motor M3 on the carriage 12 is connected through a transmission mechanism 23 to a pivot shaft 27 which pivotally connects the spray pipe 10 to the movable unit 11, so that the forward and backward rotation of the motor M3 raises and lowers the spray pipe 10. The transmission mechanism 23 comprises a transmission element 23a for transmission of power to the axle 24 of the wheels 16 disposed on the X-direction side of the carriage 12, a bevel gear 23b slidably mounted on the axle 24, and a gear mechanism 23c for transmitting the rotation of said bevel gear 23b to the pivot shaft 27, said wheels 16 and axle 24 being adapted to be rotated independently of each other, said axle 24 and bevel gear 23b being rotated as a unit. The arrangement is such that even if the movable unit 11 is moved, the resulting slide movement of the bevel gear 23b along the axle 24 assures that the rotation of the motor M3 will be always transmitted to the pivot shaft 27. It is to be noted that the rotation of the motor M3 is not transmitted to the wheels 16. The raising and lowering of the spray pipe 10 is effected in such a manner that when the carriage 12 carries the spray pipe 10 to a position between separated adjacent filter plates 4 and stops there, the motor M3 is energized to raise the spray pipe 10 to a verical position from a horizontal position shown in phantom lines in FIG. 2, and the movable unit 11 is then moved in the direction Y' to reach the solid line position in FIG. 2 and then in the direction Y to return to its original position, whereupon the motor M3 is backwardly rotated to lower the spray pipe 10 to the horizontal position shown in phantom lines in FIG. 2.

In addition, the control of the motors M1, M2 and M3 for start, stop and backward rotation may be effected by limit switches (not shown) and all the above mentioned operations are automatically carried out in accordance with the successive separation of the filter plates 4 upon completion of each filtration cycle. The supply of washing liquid to the spray pipe 10 is automatically effected at a suitable time as by a limit switch. However, since the spray pipe 10 is positioned either in or just below the group of filter plates 4, there will be no danger of the spray of washing liquid being directed away from the filter press even if it is sprayed at any time. Therefore, the timing for supply of washing liquid does not need to be strict. The spray pipe 10, when positioned between separated adjacent filter plates 4, is subjected successively to a forward turning movement from the FIG. 2 phantom line horizontal position to the FIG. 3 solid line vertical position, a to-and-fro movement in the direction Y–Y' with its vertical position maintained, and a backward turning movement from the FIG. 3 solid line vertical position to the FIG. 2 phantom line horizontal position, without projecting beyond the boundary of the filter plates. Therefore, during these two types of to-and-fro movement, linear and arcuate, it is possible to effectively wash the filter sheet 8 by supplying washing liquid to the spray pipe. Designated at 25 are splash guard curtains for shutting in the washing liquid.

Figure 5:
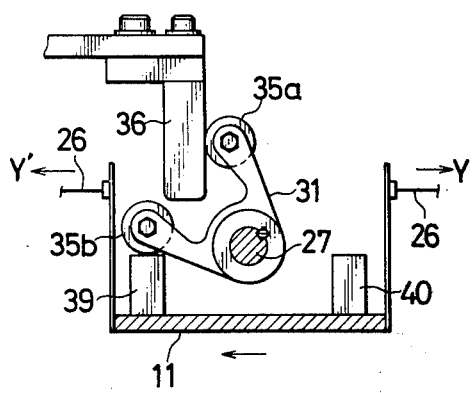
Figure 6:
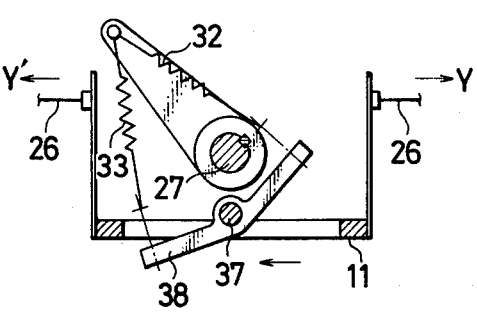
Figure 7:
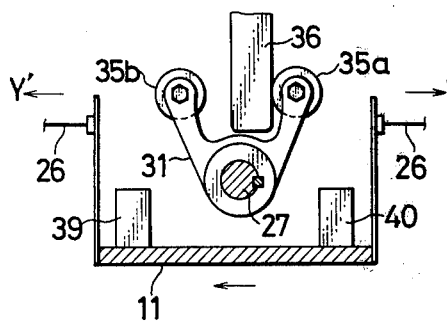
Figure 8:
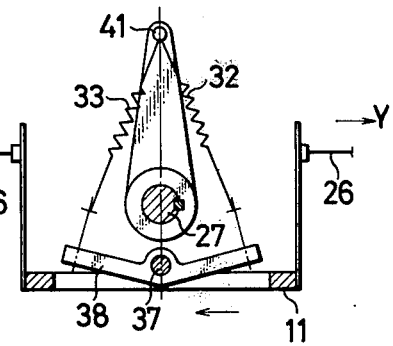

FIGS. 4 through 10 show a second embodiment which is different from the above embodiment in that whereas in the latter embodiment the spray pipe is adapted to be raised and lowered by using a motor as a drive source, it is adapted to be raised and lowered in operative association with the linear to-and-fro movement, parallel to the filter plates, of the movable unit having the spray pipe pivotally mounted therein, thereby saving one motor. The parts and mechanisms which are the same as or equivalent to those in the above embodiment are given the same reference characters as those in the above embodiment, and a description of common operations is omitted. The pivot shaft 27 pivotally connecting the spray pipe 10 to the movable unit 11 is rotatably extended in the direction X over the movable unit 11 and the extension has fixed thereon at spaced positions a driven member 31 for turning the spray pipe 10 in an arcuate path and an actuation lever 34 adapted to be actuated by springs 32 and 33 for holding the spray pipe 10 in its raised and lowered positions. The driven member 31 is provided with a pair of driven elements 35a and 35b in the form of rollers, as shown in FIG. 5, which are spaced apart a suitable distance in the direction of movement Y–Y' of the movable unit 11 and opposed to an operating member 36 fixed to the carriage 12 so that when the movable unit 11 is moved in the direction Y–Y', the driven elements 35a and 35b can be urged by the operating member 36. As shown in FIG. 6, said springs 32 and 33 are installed under tension between the projecting end of the actuation lever 34 and the ends of a seesaw member 38 pivotally mounted at its central portion to the movable unit by a pivot shaft 37 which is disposed parallel to the pivot shaft 27 on the side opposite to the projecting end of the actuation lever 34.

Figure 9:
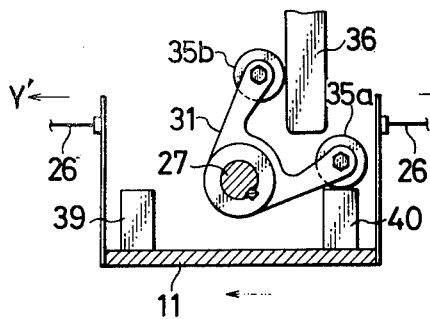
Figure 10:
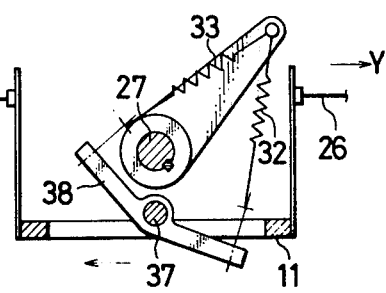

Each time the motor M1 is rotated to cause the carriage 12 to move until it carries the spray pipe 10 in the direction X' to a predetermined position between separated adjacent filter plates (not shown) and stops there, the movable unit 11 is moved to and fro in the direction Y–Y' by the rotation of the motor M2. In the initial phase of the forward movement of the movable unit 11, the driven member 31 is associated with the operating member 36 in the manner shown in FIG. 5. On the other hand, the actuation lever 34, as shown in FIG. 6, is urged by the springs 32 and 33 into an inclined position with the driven element 35b of the driven member 31 abutting against a spray pipe lowering stop 39 for holding the spray pipe 10 in its lowered position. When the movable unit 11 starts forwardly moving in the direction Y', the driven element 35a abuts against the operating member 36 on the carriage 12 and urged to be turned against the forces of the springs 32 and 33, as shown in FIG. 6. As a result, the spray pipe 10 and actuation lever 34 are also turned in the same direction, with the spray pipe 11 starting to rise. When the lever 34 is further turned from the FIG. 7 condition in which it reaches a dead point 41, it is urged by the forces of the springs 32 and 33 and thereby subjected to an oppositely directed tilting force, as shown in FIG. 10. Therefore, without the need for the driven member 31 to be urged by the operating member 36, the pivot shaft 27 can be turned to raise the spray pipe 10 until the driven element 35a abuts against a spray pipe raising stop 40, as shown in FIG. 9. The raising of the spray pipe 10 is effected in a very small portion of the initial stage of the forward movement of the movable unit 11, as is apparaent from FIGS. 5, 7 and 9. As shown in FIG. 9, since the driven member 31 has its driven element 35a already separated from the operating member 36, it will not be further acted upon by the operating member even if the movable unit continues its forward movement. Thus, the vertical position of the spray pipe can be maintained during the to-and-fro movement thereof along with the movable unit 11.

In the final stage of the backward movement of the movable unit 11, the driven member 31 has moved in the direction Y along with the movable unit 11 to assume the FIG. 9 position, with the driven element 35b abutting against the operating member 36 from the opposite direction this time. As a result, the driven member 31 is urged in the opposite direction against the forces of the springs 32 and 33 to be turned while lowering the spray pipe 10 along with the actuation lever 34. After the lever 34 reaches the dead point 41 shwon in FIG. 8, the oppositely directed urging force exerted on the lever 34 by the springs 32 and 33 turns the driven member 31 and spray pipe 10 along with the lever 34 to their initial positions. In conjunction with the lowering of the spray pipe 10 the backeard movement of the movable unit 11 is completed and the parts are kept waiting until the carriage 12 is moved to the next predetermined position.

In this embodiment, a separate power source for raising and lowering the spray pipe is unnecessary and means for setting the raising and lowering timing is also unnecessary. The actuation lever can, of course, be actuated by a single spring.

FIGS. 11 through 19 show a further embodiment of the inventioon wherein the movement of the carriage is effected in operative association with means for transferring the filter plates one by one toward the movable end plate, thus saving a drive source for moving the carriage. The washing apparatus is schematically shown and those members which are common with the preceding embodiments are marked with the same reference characters, and references will be given principally to an arrangement associated with the filter plate transfer means and the carriage and to the operation thereof.

Filter plate transfer means is known and a common type is employed in this embodiment. Thus, a transfer unit 44 having a feed pawl 42 and a stop pawl 43 is disposed at the outer lateral surface of each side bar 6 and supported on each rail 7 for movement in the direction X-X'. It is connected to an endless drive chain 47 entrained around a pair of sprockets 45 and 46. The feed pawl 42 and stop pawl 43 are pivotally mounted at their lower ends on shafts 48 and 49 and urged by springs 50 and 51 to be tilted toward the fixed end plate 3. The transfer unit 44 further comprises an idler 52 pivotally mounted on a shaft 53 whereby when one of the feed and stop pawls 42, 43 is tilted toward the other it raises the other, a stol 54 for preventing the tilting of the feed pawl 42 toward the fixed end plate 3, and a second stop for preventing the tilting of the stop pawl 43 toward the movable end plate 2. Designated at 56 are a pair of rollers disposed on the outer lateral surface of each transfer unit 44 and supported for running on the associated rail 7.

Figure 11:
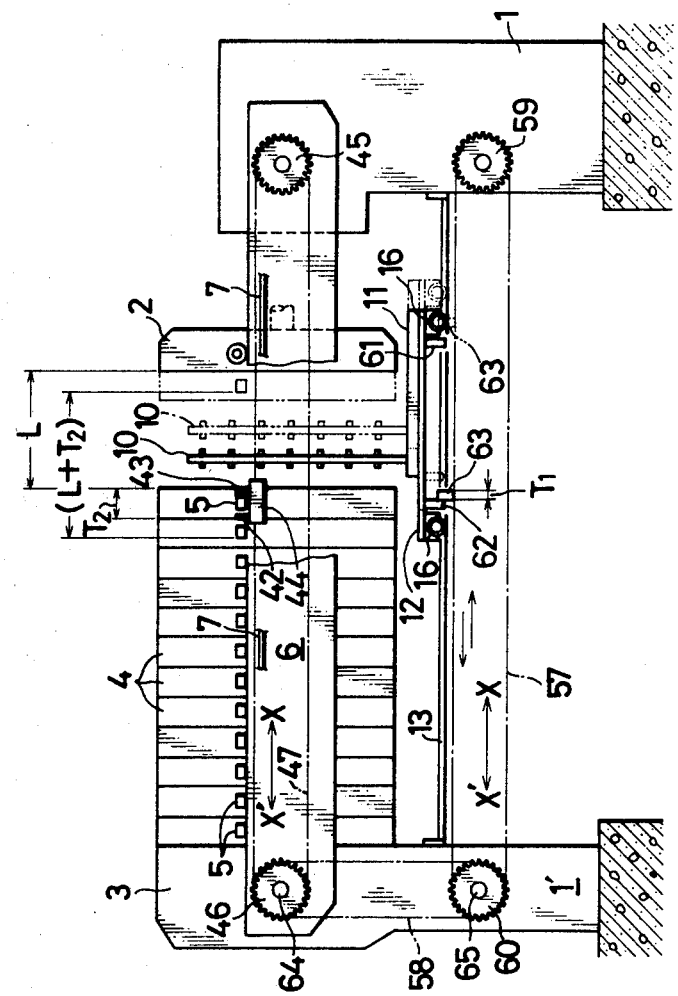
FIG. 11 is a side view of a filter press, showing another embodiment of the invention illustrating a washing apparatus wherein a carriage is adapted to be moved in operative association with a filter plate transferring mechanism.
Figure 12:
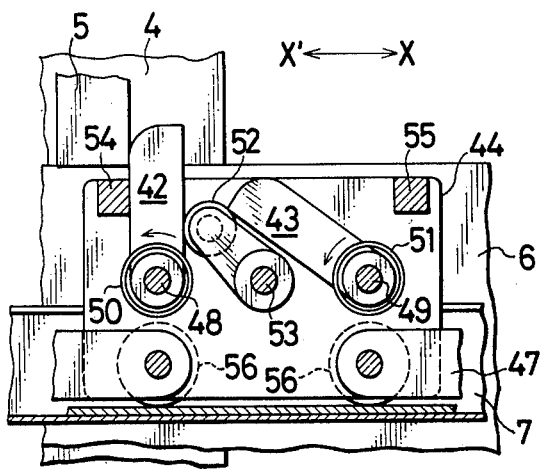
FIGS. 12 through 14 are sectional views showing the operation of a transfer unit included in the filter plate transferring mechanism.
Figure 13:
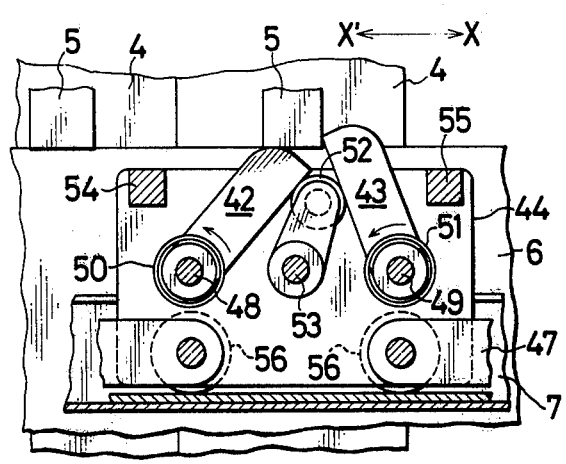

The feed pawl 42 and stop pawl 43, when in their free position, are held in the FIG. 12 condition by the forces of the springs 50 and 51. Upon completion of ech filtration cycle, the chain 47 is driven counterclockwise by a reversible motor (not shown) to move the transfer unit 44 from the machine frame 1 side toward the fixed end plate 3, i.e., in the direction X', as viewed in FIG. 11. As a result, the transfer unit 44 has its now raised feed pawl 42 brought into abutment against the handle 5 of the foremost filter plate 4. At this moment, the feed pawl 42 is tilted against the force of the spring 50 toward the movable end plate 2 by the handle 5 and, as the transfer unit 44 advances, the feed pawl 42 passes under the handle 5, as shown in FIG. 13. On the other hand, the stop pawl 43 is raised against the force of the spring 51 by the tilt of the feed pawl 42 through the intermediary of the idler 52, and as the transfer unit 44 advances, it is brought into abutment against the front surface of the handle 5, as shown in FIG. 13. Thereafter, the stop pawl is urged against the handle 5 so that it is raised until it abuts against the stop 55, as shown in FIG. 15, whereupon it prevents the further travel of the transfer unit 44. At this moment, the feed pawl 42 has passed under the handle 5 and has been raised upright by the force of the spring 50, abutting against the stop 54, as shown in FIG. 14.

Figure 14:
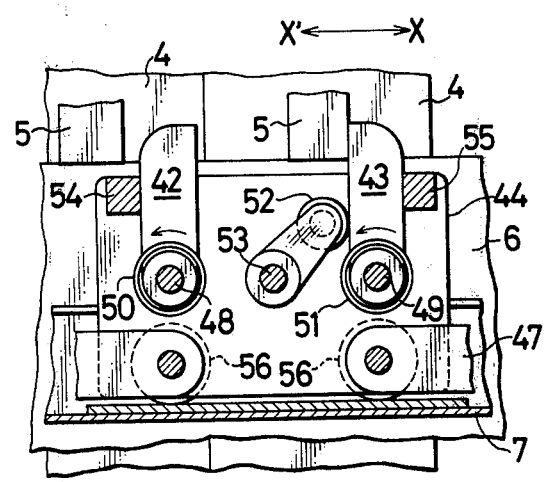
Figure 15:
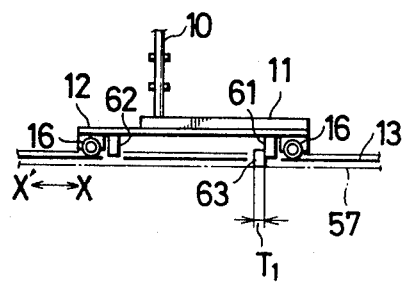
FIGS. 15 through 19 are side views showing the operation of the embodiment shown in FIG. 11 when the carriage is moved.
Figure 16:
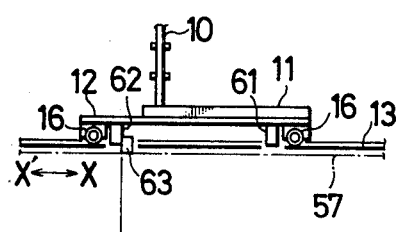
Figure 17:
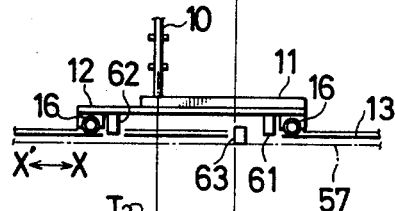
Figure 18:
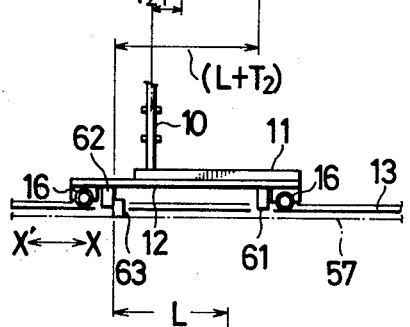
Figure 19:
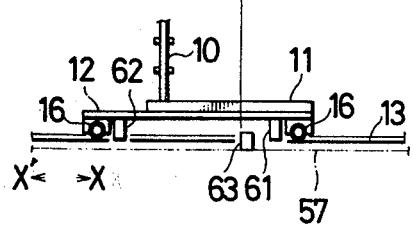

When the further travel of the transfer unit 44 is prevented in the condition shown in FIGS. 11 and 14, the resulting resistance acting on the drive chain 47 is used as a signal to reverse the motor so as to drive the drive chain 47 in the opposite direction or counterclockwise as viewed in FIG. 11. Therefore, the transfer unit 44 is retracted in the direction X, bringing the feed pawl 42 into abutment against the back of the handle 5 of the foremost filter plate 4. Since the feed pawl 42 is prevented from tilting toward the fixed end plate 3, it will not be tilted even if the transfer unit 44 is retracted, so that it pushes this filter plate 4 though the intermediary of its handle 5 for transfer toward the movable end plate 2 in the direction X. When the feed pawl 42 abuts against the back of the handle 5, the stop pawl 43 leaves the front of the handle 5, urged toward the feed pawl 42 by the spring 51 into its tilted position along with the idler 52.

When the foremost filter plate 4 has been transferred to the already retracted movable end plate 2, as shown in phantom lines in FIG. 11, the transfer unit 44 is prevented from being further retracted, and the resulting resistance acting on the chain 47 is used as a signal to forwardly drive the motor so as to drive the chain 47 again counterclockwise to send the transfer unit 44 for transfer of the next filter plate 4. At this moment, since the stop pawl 43 remains tilted, it will not abut against the handle 5 of the previously transferred filter plate 4 and hence the filter plate 4, which has been transferred toward the movable end plate 2, will not be sent back toward the fixed end plate 3. In the manner described above, the filter plates 4 are transferred one by one toward the movable end plate 2 by the reciprocating movement of the chain 47.

A reciprocating mechanism for the carriage 12 comprises an endless interlocking chain 57 extending along the rails 13 which guide the carriage 12, and an endless chain 58 which interlocks said chain 57 with the above-mentioned endless drive chain 47. The endless interlocking chain 57 is entrained around sprockets 59 and 60 mounted on the machine frames 1 and 1' and has an operating element 63 fixed thereto between and opposed to driven elements 61 and 62 projecting from the carriage 12 and spaced apart a given distance in the direction of movement X-X' of said carriage. The endless chain 58 is entrained around sprockets of the same diameter (not shown) mounted on shafts 64 and 65 on which are also mounted the sprockets 46 and 60, associated with the machine frame 1', which entrain the chains 47 and 57, respectively, whereby the chains 47 and 57 are interlocked. The driven elements 61 and 62 are spaced apart a distance S which is greater than the sum of a transfer distance L which the filter plates 4 are transferred by the feed pawl 42 of the transfer unit 44 and the width T1, as viewed in the direction X-X', of the operating element 63.

Normally, the carriage 12 has its driven element 61 urged by the movement of the operating element 63 in the direction X' in operative association with the return movement of the transfer unit 44 to its initial position, so that the carriage 12 is kept waiting in the FIG. 15 condition at its initial position corresponding to the transfer unit 44. This waiting position is such that, as shown in phantom lines in FIG. 11, the spray pipe 10 is positioned intermediate between the retracted movable end plate 2 and the foremost filter plate 4. At this position, the spray pipe 10 is subjected successively to raising, a to-and-fro movement in the direction Y-Y' parallel to the filter plates 4, and lowering, whereby it washes the filter sheet spread over the movable end plate 2 and foremost filter plate 4. Subsequently, the transfer unit 44 is moved in the direction X' for transfer of the foremost filter plate 4, and after it is stopped at the FIG. 11 position, it is then moved in the direction X to transfer the foremost filter plate 4 to the movable end plate 2, as shown in phantom lines in FIG. 11, in the manner described above. Along with this, the chain 57, in operative association with the chain 47, reciprocates the operating element 63 from the FIG. 11 phantom line position the same distance as that the transfer unit 44 travels. Tthe operating element 63, in the course of its forward travel, is brought into abutment against the driven element 62. When the transfer unit 44 reaches the end of its forward travel, the operating element 63 also reaches the end of its forward travel in solid lines in FIG. 11, thereby moving the carriage 12 in the direction X from its phantom line to solid line positions a distance corresponding to the thickness T2 of the filter plates 4. As a result, the spray pipe 10 is moved from a position (a phantom line position) intermediate between the movable end plate 2 and the foremost filter plate 4 to a second position (a solid line position) intermediate between a filter plate 4 shown in phantom lines, which has been transferred to the movable end plate 2, and a filter plate 4 next to the foremost one 4. The spray pipe can then wash the filter sheet in a space which will be defined between the foremost filter plate 4 and the next filter plate 4 when the foremost filter plate 4 is separated from the latter plate as a result of the transfer thereof. The operating element 63 is then caused to be backwardly moved from the FIG. 16 position to the FIG. 17 position the same distance as the filter transfer distance L which the transfer unit 44 backwardly travels to transfer the foremost filter plate 4. In such backward movement, however, the operating element 63 will not abut against the driven element 61 since the distance S between the driven elements 61 is greater than L + T1. Therefore, the carriage 12 can maintain its position shown in solid lines in FIG. 11 to which it has been moved.

The distance of forward travel for the transfer unit 44 to transfer the next filter plate 4 is L + T2, as shown in FIG. 11. The forward travel of the operating element 63 is effected over the distance L + T2 from the FIG. 17 position to the FIG. 18 position, thus moving the carriage 12 further from the FIG. 11 solid line position in the direction X' over a distance corresponding to the thickness T2 of the filter plates 4. More particularly, the carriage 12 and the spray pipe 10 are moved from the FIG. 17 position to the FIG. 18 position, so that the spray pipe 10 is positioned at a position intermediate between the previously transferred filter plate and the one to be next transferred. This position will, of course, be maintained unchanged, as in the previous case, even when the operating element 63 backwardly travels the distance L to the FIG. 19 position.

To sum up, each time a filter plate 4 is transferred toward the movable end plate 2, the carriage 12 is positively moved a distance corresponding to the thickness of the filter plates 4 during the forward movement of the filter plate transferring means by the means which is operatively associated with the latter, so that the spray pipe 10 is correctly positioned between filter plates 4 which are to be separated from each other. When all the filter plates have been transferred, the transer unit 44 has its stop 42 for the feed pawl 42 extracted, thereby allowing the feed pawl 42 to be prostrated or tilted toward the fixed end plate 2 under the force of the spring 50. As a result, the feed pawl 42 and stop pawl 43 are both prostrated so that they can no longer touch the handles 5 of the filter plates 4. In this condition, the transfer unit 44 is backwardly moved toward the movable end plate 2 to assume its predetermined waiting position without regard to the filter plates which have been transferred. The operating element 63 is also backwardly moved to return the carriage 12 to its initial position.

In addition, the stop pawl 54 for the feed pawl 42 provided on the transfer unit 44 may be made movable so that when the transfer unit 44 has transferred the last filter plate 4, it is moved to a predetermined position to rotate the stop 54 as by a cam so as to enable the transfer unit 44 to be automatically move backwardly.

In this embodiment, a separate drive source for intermittent movement of the carriage 12 in synchronism with the transfer of the filter plates 4, and timing setting elements are saved.

We claim:

1. A washing apparatus for a filter press wherein when the filter plates are transferred one by one toward a movable end plate, a washing liquid spray pipe having a number of nozzles is positioned between the filter plates which are being successively separated as a result of the transfer and filter sheets each spread over adjacent filter plates or the filter surfaces with such filter sheets removed therefrom are washed by the spray pipe moving between adjacent filter plates, said washing apparatus comprising the following features:

a. the spray pipe is disposed outside of the filter plates so as to be parallel to one side of the filter plate and its one end opposed to a corner of the filter plate is pivotally mounted in a movable unit which is movable parallelly to the filter plates, b. said movable unit is supported by a carriage movable in the direction of movement of the filter plates and is disposed, along with the movable unit, so as to move on said one side of the filter plates to which the spray pipe is installed parallelly and outside the filter plates, c. means is provided for intermittently moving the carriage to position the spray pipe between separated filter plates in synchronism with the transfer of the filter plates one by one toward the movable end plate, d. means is provided for forwardly and backwardly moving the movable unit in synchronism with the positioning of the spray pipe between separated filter plates by the carriage followed by the stoppage of the latter at that position, and e. means is provided for forwardly turning the spray pipe to a position where it is parallel to an adjacent side of the filter plate which is at right angles with the firstmentioned side thereof to which the spray pipe is installed parallelly and for backwardly turning it to its initial position, in synchronism with the initial stage of the forward movement and the final stage of the backward movement of the movable unit.

2. A washing apparatus as set forth in claim 1, wherein the carriage and movable unit, along with the spray pipe in its initial position, are disposed in a space below the filter plates.

3. A washing apparatus as set forth in claim 1, wherein the individual means for moving the carriage and movable unit and the means for forwardly and backwardly turning the spray pipe use respective separate reversible motors as their drive sources.

4. A washing apparatus as set forth in claim 1, wherein the means for forwardly and backwardly turning the spray pipe comprises a mechanism operatively associated with the forward and backward movement of the movable unit.

5. A washing apparatus as set forth in claim 4, wherein the mechanism operatively associated with the movable unit comprises an actuation lever secured to a pivot shaft on which the spray pipe is pivotally supported, a driven member having a pair of driven elements spaced apart in the direction of movement of the movable unit, an operating member attached to the carriage and opposed to the driven elements on the driven member, and a spring acted upon by the actuation lever and switchably loaded so that either of the driven elements is held in a position where it is capable of engaging the operating member.

6. A washing apparatus as set forth in claim 1, wherein the means for moving the carriage comprises a mechanism operatively associated with the filter plate transferring means porvided on the filter press.

7. A washing apparatus as set forth in claim 6, wherein the mechanism operatively associated with the filter plate transferring means comprises an interlocking belt extending along the path of travel of the carriage and operatively associated with a drive belt which forwardly and backwardly drives a transfer unit included in the filter plate transferring means, a pair of driven elements provided on the carriage and spaced apart in the direction of movement of the carriage, and an operating element provided on the interlocking belt and positioned between said driven elements, the distance between said driven elements being greater than the sum of the transfer distance which the filter plates are transferred by the transfer unit and the width of the operating element as viewed in the direction of movement of the carriage.

8. A washing apparatus as set forth in claim 1, wherein the means for forwardly and backwardly turning the spray pipe comprises a mechanism operatively associated with the forward and backward movement of the movable unit, and the means for moving the carriage comprises a mechanism operatively associated with the filter plate transferring means.

* * * * *